3,671,285
COMPOSITES AND INTERMEDIATES THEREFOR
Roger Prescott, Johnson City, Tenn., assignor to Great
  Lakes Carbon Corporation, New York, N.Y.
No Drawing. Filed Feb. 27, 1970, Ser. No. 15,283
            Int. Cl. C08j 1/02; C09c 1/46
U.S. Cl. 117—75                                6 Claims

ABSTRACT OF THE DISCLOSURE

Composites, preimpregnated tapes, and sized-carbon fiber, prepared by coating carbon fibers with a high cross-section metal or metalloid and resin then curing the resin while irradiating the fiber with a source of thermal neutrons, improves bonding between resin and fiber.

BACKGROUND OF THE INVENTION

Composite materials, for use in the aerospace industry, are well-known to the art. Such materials comprise a resinous binder, as for example a polymerized epoxide and a filler, as for example asbestos, glass fibers, or carbon fibers.

Of the above named fillers, carbon fibers have received attention due to their high corrosion and temperature resistance, low density, high tensile strength and high modulus of elasticity.

Uses for such carbon-fiber reinforced composites include aerospace structural components, rocket motor casings, deep submergence vehicles, and ablative materials for heat shields on re-entry vehicles.

The incorporation of carbon or graphite particles in resin bases in amounts of up to 60 percent by volume will impart a heat-conducting property but not an electrical conductivity to the component. Litant, in U.S. 3,406,126, teaches the addition of carbon yarn in as little as 0.05 percent by volume to the resinous matrix to impart electrical conductivity to the resulting composite. Such composites can be prepared from polyesters, polyvinyl chloride, polyepoxides, or the resins, and carbonized rayon, acrylic, or like fibers.

High modulus composites usually have low shear strengths parallel to the direction of the fibers of about 3000 to 4000 p.s.i. These low shear strengths are probably due to poor bonding between the carbon fibers and the matrix. Attempts to improve this bonding, particularly between rayon-based carbon fiber fillers and an epoxy-matrix have been partially successful, but have resulted in a degradation of the ultimate tensile strength of the fiber and also of the fabricated composite.

Improved bonding has been accomplished by plating the fiber with various metals, as for example tantalum, with metal carbides, as for example whiskers of silicon carbide, and with nitrides.

More recently, carbon fibers have been treated with various oxidizing agents in order to etch the surface of the fiber. Such oxidizing agents have included air, ozone, concentrated nitric acid, and chromic-sulfuric acid. In most cases the oxidative treatment of rayon-based carbon fibers resulted in a decrease in ultimate tensile strength of the fiber and of the fiber-resin composite.

The primary structural properties of fiber-resin composites improve as carbon fiber content is increased up to about 65 volume percent then decreases as the fiber content exceeds that aforementioned figure. The preferred range of carbon fiber content is about 45 to 65 volume percent of fiber in the fabricated composite.

OBJECTS OF THE INVENTION

It is an object of this invention to provide a resin-based composite containing carbon fibers which composite possesses superior interfacial bonding properties without concomitant loss in tensile strength.

It is a further object of this invention to provide a resin-based composite containing carbon fibers, which composite possesses superior interfacial bonding properties over composites containing untreated fibers of the same material without concomitant loss in tensile strength.

It is a further object of this invention to provide a method for preparing such composite.

Further objects will become evident to those skilled in the art upon a further reading of the description of this invention.

SUMMARY OF THE INVENTION

The above objects can be accomplished by coating a carbon fiber with a metal, metalloid, or compound thereof possessing a high cross-section for the capture of thermal neutrons, then sizing the coated fiber with resin and curing the resin while irradiating the fiber with thermal neutrons. Alternatively, the metalloid, metal, or compound coated fiber can be used to prepare a composite material, or a preimpregnated tape, consisting of the fiber and a resin matrix. The preimpregnated tape is cured to the B-stage or the composite is completely cured in the presence of a source of thermal neutron irradiation. Absorption of thermal neutrons by the metal or metalloid causes release of energetic particles which ionize the molecules at the interface improving bonding of carbon and matrix.

The process provides sized fibers or tapes for use in making composites or the like, or composites with high interfacial bonding at the fiber-matrix interface.

DETAILED DESCRIPTION OF THE INVENTION

High modulus acrylic-based carbon fibers useful for this invention are defined as those fibers possessing a tensile strength of greater than $100 \times 10^3$ p.s.i. and a Young's modulus greater than $20 \times 10^6$ p.s.i. Such fibers can be prepared by the method of Shindo, "Studies in Graphite Iiber Report No. 317 of the Government Research Industrial Institute," Osaka, Japan, 1961, and Tsunoda, U.S. 3,285,686. Typically, acrylic-fibers can be stretched to about 50 to 100 percent of more of their original length while heating in the presence of water or steam to about 100° C., oxidized in an oxidizing atmosphere at about 200 to 300° C. for a period of up to 4 hours, oxidized in a second stage in an oxidative atmosphere at 200 to 375° C., and pyrolyzed and/or graphitized at 1000 to 3000° C. in a nonoxidizing atmosphere to prepare a carbon fiber possessing a high modulus of elasticity and a high tensile strength.

Fibers prepared by the above disclosed method can be treated by the process of this invention to prepare composites of superior shear strength.

Resins useful to prepare the matrix of the composites of this invention include epoxide, polyimide, polyamide, polyester, crystalline or amorphous poly-lower alkylene, and "Friedel-Crafts" type resins. By "Friedel-Crafts" type resin is meant a resin formed from an aromatic compound with an aromatic linking agent which has two groups, such as methoxymethyl or chloromethyl, attached to the aromatic nucleus, by means of a polycondensation reaction involving the phenyl hydrogen atoms, Trans. and J. of the Plastics Inst. (London) 32; No. 101, pp. 298–302 (1964).

By the process of this invention, the above carbon fiber is coated with a metal, metalloid, or compound thereof with a high cross-section for thermal neutrons and which will emit a high energy particle upon bombardment. Such metal and metalloid materials include boron, potassium, iron, zinc, and the like. Also included within the scope of this invention is the use of compounds containing the above metals and metalloids. Examples of such compounds include the chlorides, nitrides, bromides, oxides, carbonates, permanganates, borates, argenates, and the like salts.

Absorption of a thermal neutron by an above or like metal or metalloid nucleus of high cross-section causes emission of an energetic particle from the parent nucleus. This particle then causes heavy ionization along its path, which is concentrated at the fiber-matrix interface in the composite material. The localized ionization causes activation of chemical bonds in the region of the interface, thereby increasing the bond strength between the fiber and matrix.

The preferred metal and metalloid isotopes will, upon bombardment, emit a particle which will have a limited path length, as of the order of 0.1 to about 10 microns. The desired path length will limit the activation upon irradiation to the area of the carbon and resin interface.

The carbon fiber of this invention is incorporated in amounts of about 45 to about 65 percent by volume in a resin and polymerized in a manner well-known in the art to give a high shear strength composite. Exemplification of this method has been provided by Rees, U.S. 3,276,931, and Warner, U.S. 3,281,300.

The physical properties of the prepared composite including tensile, compression, and shear strengths, are measured by methods also well known in the art. More specifically, in order to prepare test composites, the fiber is wound onto a 7 inch diameter drum which contains an exterior 0.005 inch Teflon sheet coating. A transverse guide is driven at a constant rate based on yarn diameter to provide parallel alignment of the yarn without voids or overlap of the fibers. While winding, a solution of 38 weight percent epoxy resin (Shell Epon 826), 12 weight percent meta-phenylenediamine (E. I. du Pont de Nemours), and 50 weight percent anhydrous methyl ethyl ketone in an amount 2–2½ times that required for the composite is added to the winding and the mandrel is heated to provide a surface temperature of 75° C. in order to effect a precure or B-stage in the resin system and evaporate the excess solvent. The additional material is provided to permit adequate flow and bleed-out. Winding is continued until a single layer of composite has been accumulated on the drum. The resulting composite is cut transversely, pulled from the drum, and spread flat on Teflon sheeting to provide a B-stage tape. Such tape is cut into appropriately dimensioned segments and the segments are stacked into a Teflon-lined mold, aligning the fibers, until an amount needed to form a 0.12 inch thick composite bar has been accumulated. The mold containing the stacked tapes is placed in a heated-platen press, held under a pressure of 5 millimeters of mercury for one hour, then heated at 100° C. for 2 hours under a pressure of 300 p.s.i.g. and at 200° C. for one hour under the same pressure to effect cure.

The cured composite is tested for flexural strength, flexural modulus, tensile strength, tensile modulus, volume percent of fiber, shear strength, and density. A sample composite bar is loaded in a three-point configuration on a 2 inch span (the supports and loading surfaces being the radial faces of 0.5 inch diameter steel pins). Stress is applied until failure, giving a linear stress-strain curve from which the flexural strength and flexural modulus of the composite can be calculated. A second sample of the composite is loaded in a three-point configuration on 0.4 inch centers consisting of the radial surfaces of 0.375 inch diameter steel pins, providing a length to depth ratio of 3.3:1. The bar is flexed to failure. Depending upon the tensile properties of the reinforcing yarn and the quality of the resin matrix to graphite yarn interfacial bonding, three predominate modes of failure are noted. A transverse (tensile) failure showing a sharp peak in the stress-strain curve at the failure point results from high shear properties in conjunction with relatively lower tensile strength properties of the yarn. Shear strength values obtained with transverse failure of this type are not true indications of interlaminar shear strength but are minimum values since the tensile strength of the bar failed before a true shear failure is attained. Low shear strength bars failed at the carbon-resin interface parallel to the long dimension of the sample.

The metal or metalloid coating and neutron bombardment of this invention can be applied to carbon fibers prepared by the above-exemplified method or to the same carbon fibers after they have been surface treated in such a manner as to etch or pit the surface. Such method of etching or pitting the surface has been disclosed by J. W. Johnson in Belgian Pat. 708,651 and by K. Miyamichi et al. in Japanese Pat. 8995/68.

The following examples are illustrative of the method of this invention but are not to be construed as limiting thereupon.

EXAMPLE 1

A 5 g. sample of carbon fibers is coated with a monomolecular layer of boron by vapor deposition at a temperature of about 1300° C. utilizing resistance heating technique such as described in U.S. 3,409,467. The coated fiber is then formed into a composite by aligning strands thereof in a parallel manner and coating the whole with 10 ml. of an epoxy matrix resin containing a catalytic amount of meta-phenylenediamine. Pressure, 300 p.s.i.g., is applied to remove the excess resin and compress the fibers. The compressed tape is subjected to a curing temperature of about 100° C. for 2 hours and a bombardment of $10^{12}$ neutrons/cm.$^2$/sec. from a source of thermal neutrons.

EXAMPLE 2

An aqueous solution of 5% by weight of boric acid is prepared. Five g. of the carbon fiber is immersed in the solution, then allowed to air dry. The dried fiber is treated as above to prepare a composite and subjected to cure at 100° C. for 2 hours in the presence of $10^{12}$ neutrons/cm.$^2$/sec. from a source of thermal neutrons.

EXAMPLE 3

A 5 g. sample of carbon fibers is immersed in a 5 percent aqueous solution of sodium tetraborate, removed, and allowed to air dry. The coated fiber is then immersed in an epoxy resin containing a catalytic amount of m-phenylenediamine. The fiber is removed and heated to 100° C. for 2 hours in the presence of a thermal neutron source of $10^{12}$ neutrons/cm.$^2$/sec.

What I claim is:

1. A method for preparing sized carbon fibers, preimpregnated tapes, and composites of carbon fibers and a resin matrix which comprises (1) coating a carbon fiber with a metal, metalloid or compound thereof which has a high cross-section for thermal neutrons;

(2) coating the fiber from (1) with a resin; and (3) curing the resin while irradiating the fiber with a source of thermal neutrons.

2. The method of claim 1 wherein the metal, metalloid, or compound thereof is a compound of boron.

3. The method of claim 2 wherein the boron compound is boric acid.

4. A composite prepared by the method of claim 1.

5. A preimpregnated tape prepared by the method of claim 1.

6. A sized carbon fiber prepared by the method of claim 1.

References Cited

UNITED STATES PATENTS

| | | | |
|---|---|---|---|
| 3,406,126 | 10/1968 | Litant | 252—511 |
| 3,440,181 | 4/1969 | Olstowski | 252—511 |
| 3,549,509 | 12/1970 | Casalina | 117—93.31 |

DOUGLAS J. DRUMMOND, Primary Examiner

U.S. Cl. X.R.

117—71 R, 93.31, Digest 10; 204—159.14; 252—511